CODE PUNCHING APPARATUS FOR CALCULATING MACHINES

Original Filed Aug. 8, 1957 4 Sheets-Sheet 1

INVENTOR.
Carlos Wittenmyer
BY
Wood, Herron & Evans
ATTORNEYS.

INVENTOR.
Carlos Wittenmyer.
BY
Wood, Herron & Evans.
ATTORNEYS.

Feb. 7, 1961 C. WITTENMYER 2,970,752

CODE PUNCHING APPARATUS FOR CALCULATING MACHINES

Original Filed Aug. 8, 1957 4 Sheets-Sheet 3

INVENTOR.
Carlos Wittenmyer.
BY
Wood, Herron & Evans.
ATTORNEYS.

INVENTOR.
Carlos Wittenmyer
BY
Word, Herron & Evans
ATTORNEYS.

United States Patent Office 2,970,752

Patented Feb. 7, 1961

2,970,752

CODE PUNCHING APPARATUS FOR CALCULATING MACHINES

Carlos Wittenmyer, 6314 7th Ave. S., St. Petersburg, Fla.

Original application Aug. 8, 1957, Ser. No. 677,071. Divided and this application Nov. 21, 1958, Ser. No. 775,573

5 Claims. (Cl. 234—99)

This invention relates to an apparatus for recording numerical quantities by punching a coded pattern of holes in a record sheet to be subsequently read or decoded by a reading apparatus.

The present invention is a division of the co-pending application of Carlos Wittenmyer entitled "Punching and Reading Apparatus for Calculating Machines," Serial No. 677,071, filed on August 8, 1957. The co-pending application is directed particularly to the apparatus which reads the coded pattern of holes and actuates the keys of a calculating machine to print the recorded sum upon the record sheet.

One of the primary objectives of the present invention has been to provide a punching apparatus which may be interconnected with a conventional calculating machine as an attachment, wherein the sum is entered into the calculator by depressing the numeral keys manually in the conventional way, causing the punching apparatus to punch in the record sheet a coded hole pattern which represents the amount entered. The calculating machine also causes the amount to be printed on an adjacent portion of the record sheet according to the normal practice.

The coded hole pattern provided by the punching apparatus coacts with the reading apparatus of the co-pending application which also is interconnected with the calculator as an attachment. Accordingly, the digits representing a given sum are fed into the calculator and punched upon the record sheet during one transaction, and the reading apparatus interprets and feeds the recorded sum into the calculator during a subsequent transaction. In this way, the pattern-recorded sum may be combined with new sums fed manually into the machine to produce, in an automatic manner, a total or result reading of the two sums. The new result may then be punched in the record sheet in the same manner so as to provide a running balance of subsequent transactions or computations.

A further objective of the invention has been to provide a simplified hole pattern or code, wherein a limited number of holes, punched in various combinations within a relatively small pattern area, records consecutive numbers from zero to nine, thus saving a great deal of space on the record sheet and simplifying the mechanism of the punching apparatus. Broadly, the concept of utilizing a perforated record sheet in conjunction with a tabulating machine, typewriter or the like is known in the art. However, as applied to a calculator, the known apparatus utilizes one hole for each digit to be recorded and read, such that a total of ten holes may be required to record the digits from zero to nine.

According to the present invention, the punching apparatus utilizes four punches to record the digits from one to nine by activating two punches of the group in various combinations according to the code system. The four punches locate one or two holes in various positions within a small pattern for each digit to be recorded. Accordingly, a line of digits representing a given sum is recorded in a corresponding line of code patterns on the record sheet, one pattern for each digit. The zeros are obtained by leaving in blank the particular pattern spaces corresponding to the zeros in the line of digits.

As noted earlier, the punching and reading apparatus are both interconnected with the calculating machine to provide the successive punching and reading operations; therefore, the punching apparatus is disclosed herein in relation to the reading apparatus of the co-pending application. In general, the punching apparatus and reading apparatus are interconnected with a calculator of the type having a column of keys for each digit to be entered into the machine. When a sum is entered manually, the operator depresses the keys of the columns in the conventional way; for example, if the number 13,800 is to be entered, the operator depresses the "1" key in the first column to the left, the "3" key in the second column, and so on, working from left to right. The three zeros may be entered by depressing zero keys, although in many cases the machine is equipped to enter the zeros automatically.

According to the code system utilized by the punching and reading apparatus, the "1," "2," "4," and "7" keys of a conventional calculator are utilized to enter the digits from one to nine in response to the perforated pattern. In order to actuate the calculator keys, the "1," "2," "4" and "7" keys of each column are equipped with an electrical device for power operation in response to reader signals, while the remaining keys of the column are not disturbed. The apparatus takes advantage of the accumulating action of the conventional calculating machine to enter the coded digit by one or two-time operation of the above keys. By way of example, if the numbers 1, 2, 4 or 7 are punched in the record sheet, then that number is entered into the machine from the record sheet by direct electrical actuation of one of the designated keys. If numbers other than those of the designated keys are to be entered (3, 5, 6, 8 and 9) then the digit is entered by the two-time sequential operation of the electrical keys. Thus, if the number 3 is to be entered, then the "1" and "2" electrical keys are depressed in sequence so that the accumulator of the calculator adds together the "1" and "2" to enter the total "3." The remaining digits (5, 6, 8 and 9) are also obtained by the two-time operation of other keys in sequence and in proper combinations. The key-actuating devices are in the form of electrical motors or solenoids, each connected to the respectively "1," "2," "4" and "7" keys and arranged upon being energized to depress and release the key in a manner similarly obtained by manual operation. The actuating devices do not interfere with the manual operation of the keys.

In order to illustrate the principles of the invention, the punching apparatus is disclosed in relation to the printing attachment disclosed in the prior patent to Carlos Wittenmyer, No. 2,637,493, issued on May 5, 1953. The patent discloses a printing attachment which is operatively connected to the result wheels of a calculating machine so as to print the result of a calculation on a record sheet. According to the present disclosure, the printing attachment is modified to print the amount entered and also to punch the corresponding hole pattern in another portion of the sheet.

Briefly, the punching apparatus comprises respective shiftable punch sectors, one for each punch pattern which represents a digit. The punch sectors are generally similar to the printing sectors shown in the patent; however, instead of a raised type face, the working face includes patterns of slots or recesses which are coded in accordance with the hole patterns. The punching action is obtained by the group of four punches for each punch sector, the punches of each group having upper ends residing adjacent the working face of its punch sector. The arrangement is such that those punches which reside in registry with the slots are inactive while those in registry with the working faces are active. When a digit is entered into one of the columns, the printing and punching sectors for that particular column swings through an arc to a position corresponding to that digit. During the printing and punching cycle, the record sheet is forced upwardly against the lower or active ends of the punches. Accordingly, those punches in registry with the slots are free to move upwardly with the sheet, while those in contact with the working face of the sector are locked down and caused to punch the sheet as it is forced upwardly. The arrangement of the slots in the working face of the punching sector thus selects the active punches in accordance with the code pattern.

It will be understood that the punching apparatus is capable of a wide variety of uses involving mathematical computations of various kinds. For purposes of illustration, the apparatus is disclosed herein in relation to a balance sheet used in keeping a running account of successive banking transactions, wherein the last balance is printed and recorded as a hole pattern. When a deposit is made, the clerk enters the amount by depressing the calculator keys in the usual way; he then inserts the sheet into the printing attachment which prints the amount of the deposit. After the deposit is printed, the clerk shifts the sheet to a second position, wherein the hole pattern, which represents the old balance is scanned by the reader. The reader decodes the old balance and transmits electrical signals to depress the electrical keys, thus entering the old balance into the accumulator to be added to the deposit to form a new balance. The sheet is now shifted to a printing position, the new balance is printed on the statement, and a hole pattern representing the new balance, is perforated by the punching apparatus, thus completing the transaction. It will be understood that withdrawals from the account are transacted in the same sequence except that the amount of the withdrawal is subtracted from the balance and subsequently recorded on the sheet as a new balance, following the above sequence of operations.

The various features and advantages of the invention will be more fully apparent to those skilled in the art from the following detailed description taken in conjunction with the drawings.

*Structure and operation generally*

Figure 3:
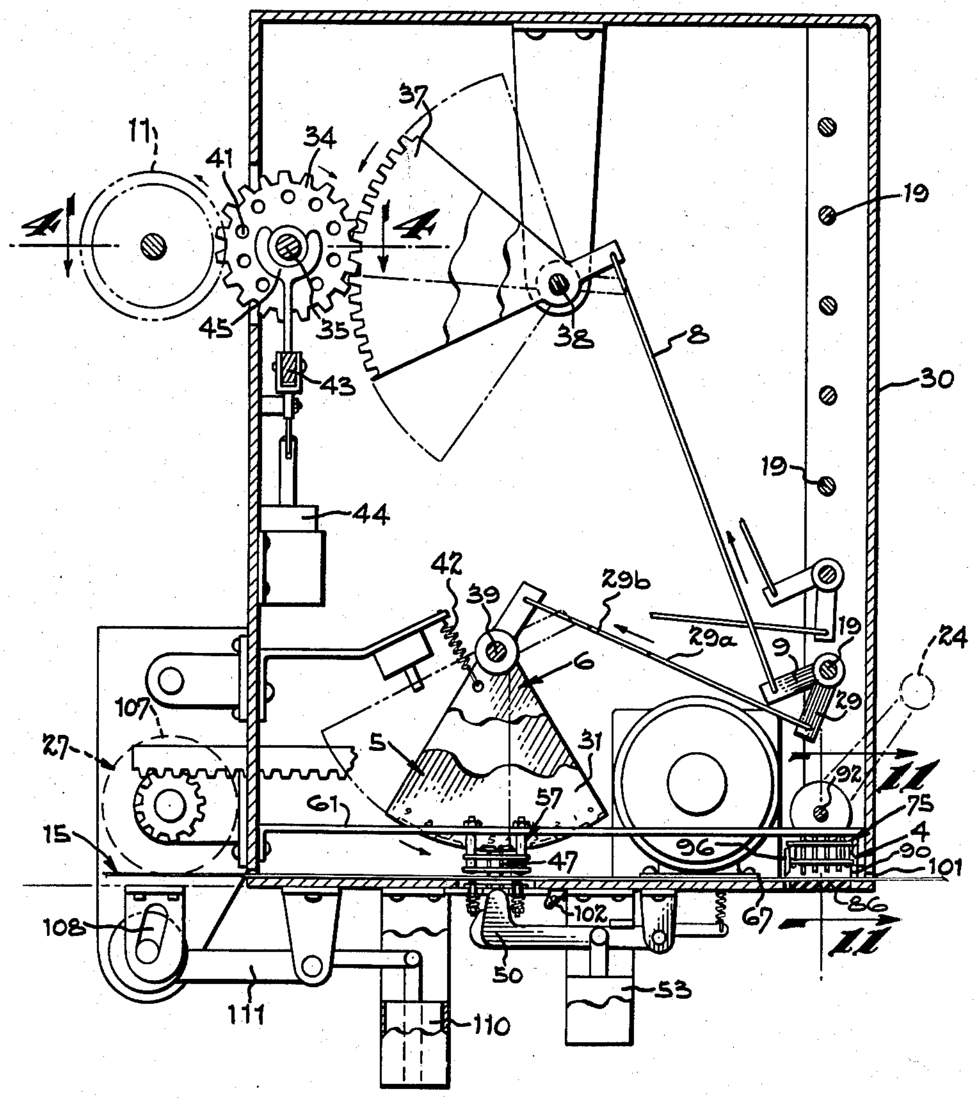
Figure 3 is an enlarged sectional view taken along line 3—3 of Figure 1, detailing the driving system from the result gears of the calculator to the punching sectors.

In order to illustrate the principles of this invention, the drawings illustrate the card punching apparatus incorporated in the printing attachment of a calculating machine according to the aforesaid Wittenmyer Patent No. 2,637,493, the printing attachment being modified, as explained later, to accommodate the apparatus. The reading apparatus of the co-pending application is included in the drawings to illustrate the utility of the invention. In the present disclosure, the punching apparatus and reading apparatus are shown in simplified form in order to present the operating principles in a clear and understandable manner. As disclosed, the reading and punching operations are controlled manually, at least in part; however, it will be understood that it is contemplated to utilize an automatic control system to provide rapid, sequential execution of the punching and reading cycles, as well as automatic printing, as disclosed in the patent. It will also be understood at this point, that the printing apparatus and reading apparatus may comprise separate machines or attachments for operations in conjunction with respective calculating machines of conventional design, instead of being incorporated in a single attachment as disclosed herein.

Figure 1:
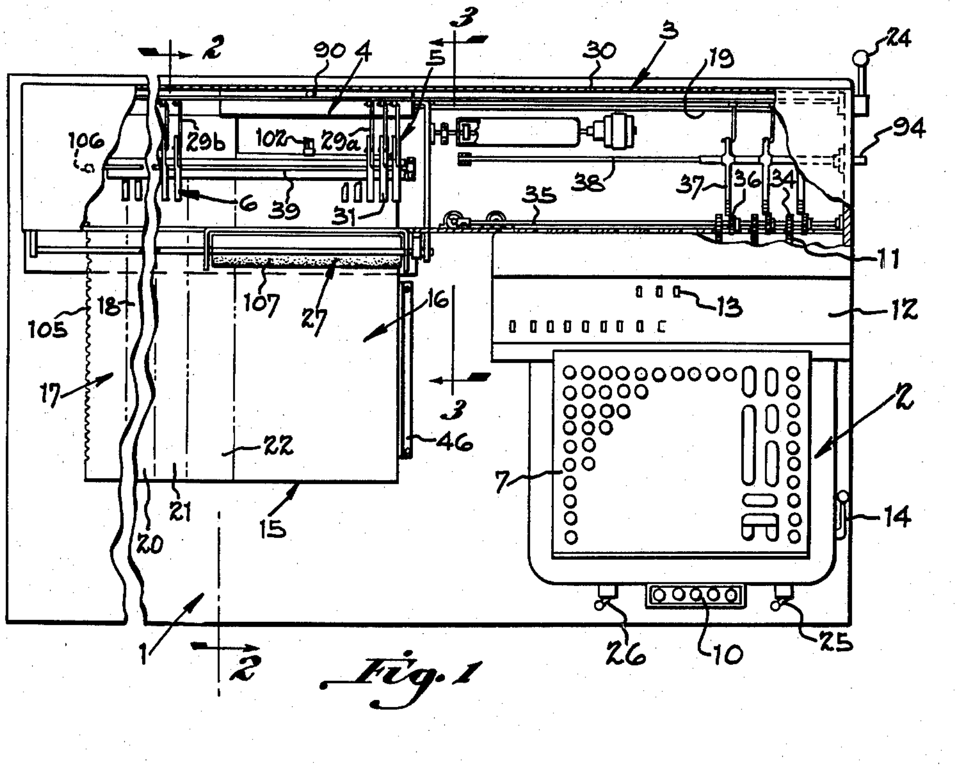
Figure 1 is a top plan view of a calculating machine equipped with a printing attachment which includes the punching apparatus of this invention.
Figure 2:
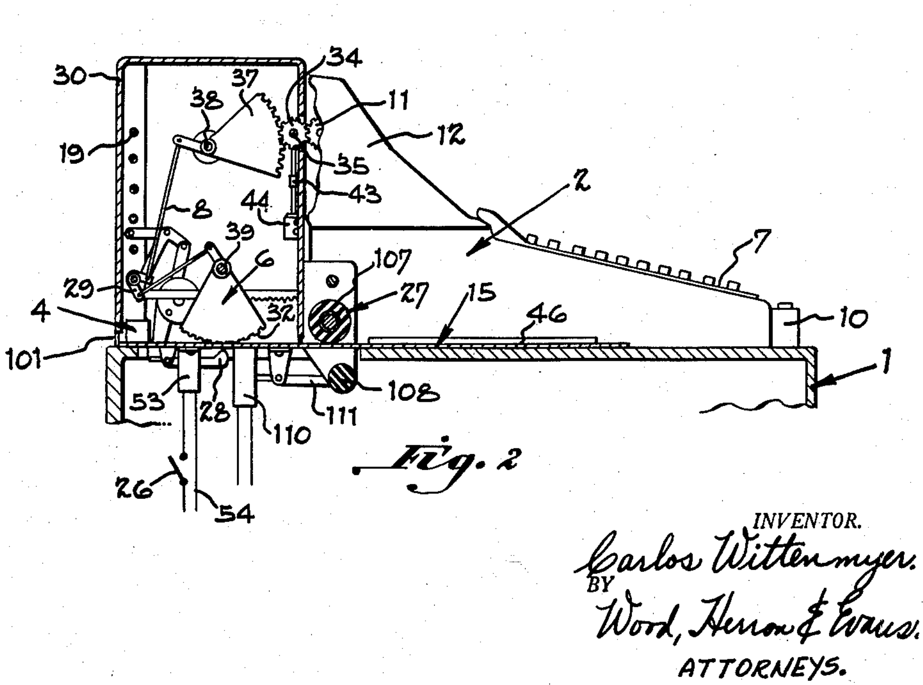
Figure 2 is a sectional view taken along line 2—2 of Figure 1, illustrating generally the interconnection of the punching sectors with the result wheels of the calculator.

Described generally with reference to Figures 1 and 2, a typewriter desk or table, indicated generally at 1 supports a calculating machine 2 which is operatively connected to a printing attachment 3 of the type disclosed in the above patent. In the present disclosure, a reading apparatus, indicated diagrammatically at 4 in Figure 1, is located in the rearward portion of the printing attachment.

The punching apparatus of this application is also incorporated in the printing attachment, as indicated generally at 5. To accommodate the added mechanism, the housing of the printing attachment 3 has been extended lengthwise such that the printing sectors, indicated generally at 6, reside adjacent the punching apparatus 5. As explained later in greater detail, the operating components of the printing attachment 3 are also utilized in part to actuate the punching and reading equipment.

The calculating machine 2 is provided with a keyboard 7 which comprises the usual column of keys for entering digits in the order of zero to nine. With the exception of the result wheels which, as explained later, operate the printing and punching mechanism, the details of the calculating machine have been omitted since they are not relevant to the invention.

The invention is described herein as applied to an accounting system used in banking transactions, particularly the balancing of a checking account; hence, the disclosure is made in relation to adding and subtracting amounts from a bank balance. As described in the Wittenmyer Patent No. 2,637,493, the decimal places of the figures printed on the balance sheet are selected manually by decimal switches 10 which are located along the forward edge of the calculating machine. These switches are interconnected with the printing attachment and shift the carriage rollers laterally. According to the present disclosure, the decimal selector mechanism has been modified to shift the balance sheet to positions aligning its deposit or withdrawal columns with the printing sectors. No decimal selection is required when the machine is used for straight addition or subtraction in banking operations.

It will be understood at this point, that the calculating machine includes an accumulator mechanism, which, when set for adding, stores the amount entered into the machine upon depressing the keys, adding each sum sequentially entered to provided the sum total. This sum appears on a series of rotatable number wheels having digits from zero to nine. These wheels are driven by result gears 11 and are located in a row within the carriage 12 of the calculator; the numerals are visible through windows 13 formed in the carriage. In conventional operation, the sum total is observed and recorded, then the machine is cleared by operating a cancelling lever 14 which rotates the result wheels back to their zero position.

The standard calculator is equipped with keys or bars for adding or subtracting. It also includes a sub-total key (not shown) which is depressed to store a sub-total (the sum of several amounts entered) which is later added to or subtracted from amounts entered to create a total amount. To bring about the punching and reading operations, the printing apparatus of the patent is modified slightly to punch and print when the cancelling lever 14 is operated and also when the sub-total key is actuated, as described later.

According to the prior Wittenmyer patent, the rotary motion of the result wheels from an indicating position (whether total or sub-total) back to zero is utilized to shift the printing sectors 6 of the attachment 3 to positions in which they print upon a record sheet a line of figures corresponding to the sum total previously displayed by the result wheels. In the present structure, the same apparatus conditions the punching mechanism to punch the coded hole pattern in the record sheet alongside the printed figures. This hole pattern subsequently is utilized to reproduce a corresponding number when the sheet is inserted into the reading apparatus 4. This operation causes the previous balance or total, which is decoded by the reader from the punched holes, to be entered into the accumulator and added to or subtracted from another amount which is entered manually by depressing the keys.

To bring about the reading operation, the keys of the calculating machine are provided with electrical operating devices which depress selected keys in the columns in response to electrical signals from the reading device. These signals are generated in accordance with the coded hole pattern of the record sheet. Thus, according to the present example, the same calculating machine is operated both manually (in entering sums to be added or subtracted), and electrically in response to the reader to calculate the sum of or the difference between the two amounts.

Figures 10, 11, 12, 13, 14, 15, 16, 17:
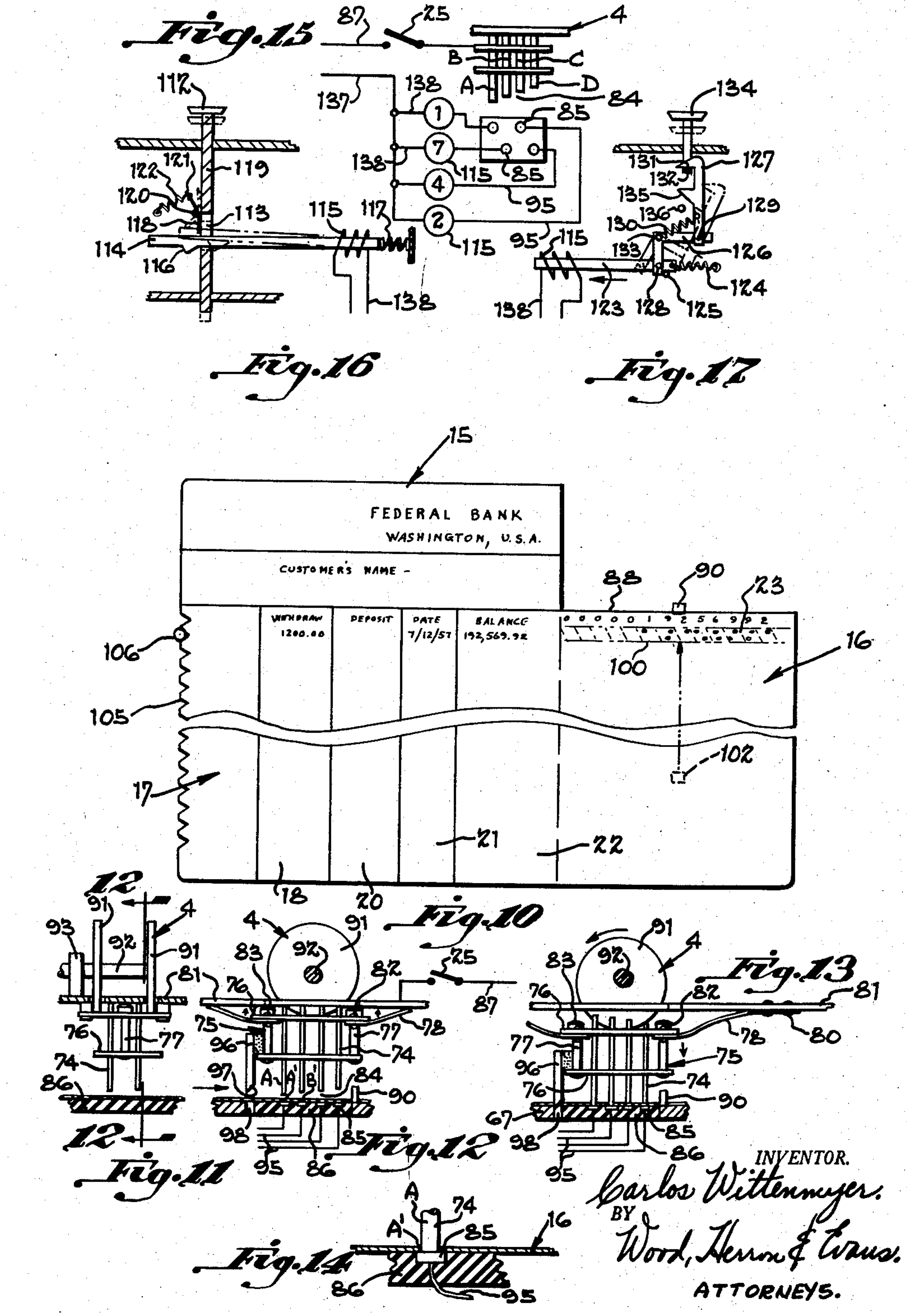
Figure 10 illustrates a typical bank statement sheet for use with the present punching apparatus.
Figure 11 is a sectional view taken along line 11—11 of Figure 3, detailing one of the reading devices which coact with the punching apparatus.
Figure 12 is a sectional view taken along line 12—12 of Figure 11, showing a development of the reading device in inactive position relative to a perforated record sheet.
Figure 13 is a view similar to Figure 12, showing the position of the parts during a reading cycle.
Figure 14 is an enlarged fragmentary sectional view taken from Figure 13, detailing one of the contactors of the reading device.
Figure 15 is a diagrammatic view showing the electrical circuit interconnecting the reading device with the key actuating solenoids of the calculating machine.
Figure 16 is a diagrammatic sectional view illustrating one of the electrically operated actuating devices of the calculating machines.
Figure 17 is a diagrammatic view illustrating a modified key actuating device.

Referring to Figure 10, there is disclosed a bank statement indicated generally at 15 which is utilized with the present apparatus in keeping a running account of the balance as sums are deposited or withdrawn from the account. The balance sheet preferably is fabricated from cardboard and includes a punching section 16 along its right hand side and a printing section 17 along its left hand side. The printing section is sub-divided to provide a column 18 for amounts withdrawn, a column 20 for amounts deposited, a date column 21, and a balance column 22. Each time an amount is deposited or withdrawn from the account, the remaining balance is punched in the card as indicated at 23 and the corresponding balance is also printed in the balance column alongside the hole pattern, as shown.

In the example illustrated in Figure 10, the customer has withdrawn the sum of $1200.00 leaving a balance of $192,569.92 the $1200.00 having been subtracted from the previous balance ($193,769.92) not shown. It will be noted that the punching section 23 is perforated to record the same amount which is printed in the balance column.

According to the present example, the entry of a new deposit (or withdrawal) and the entry of a new balance is brought about in three separate operations. In the first operation, assuming that a deposit is made, the clerk inserts the balance sheet 15 in the apparatus and depresses one of the selector keys 10, thereby to shift the carriage (and balance sheet 15) laterally to align the deposit columns with the printing sectors. Next, he depresses the add bar, then enters into the calculator the amount of the deposit. Finally, he actuates the sub-total key; this causes the amount of the deposit to be printed in the deposit column 20 by operation of the printing attachment through its automatic cycle. At the end of the cycle, the sub-total (amount deposited) remains stored in the calculator.

In a second operation, the balance sheet is shifted to a second position to be scanned by the reading apparatus 4 which actuates the calculator electrically to enter the amount of the previous coded balance ($192,569.92) into the accumulator; no printing is done at this time. Since the sub-total remains in the machine from the first operation, the amount of the deposit (sub-total) is added automatically to the previous balance during the reading operation. The new balance (sum total of the deposit and previous balance) thereafter is printed and punched on the record sheet 15, one line below the previous balance in a third operation, as described below. In the present example, there is provided a reader lever 24 (Figure 1) which is shifted manually to actuate the reading apparatus 4 in the second operation. To energize the reading apparatus, an electrical switch 25, located along the front of the calculator, is closed manually before the lever 24 is actuated.

In the third operation, a punching switch 26 is shifted manually to provide the balance punching operation. The clerk now shifts the record sheet from its scanning position relative to the reader back to its first position and actuates the cancelling lever 14 to cause the new balance to be printed and punched on the balance sheet. During the punching cycle, when the sheet is properly positioned, the control apparatus energizes a plurality of electrically operated type hammers 28, one set of hammers impressing the printed type and a second set actuating the punch mechanism as described in detail later.

As stated earlier, the carriage rollers 27 shift the record sheet laterally to locate the several columns in the printing position. This is brought about by depressing the proper selector switch 10 before each amount is printed (deposit, withdrawal and balance).

*Punch selector mechanism*

As best shown in Figure 1, the punching apparatus 5 and printing apparatus 6 are located within the housing 30 of the printing attachment in side-by-side relationship in positions to act upon the punching section 16 and printing section 17 of the bank statement 15. The punching apparatus includes a series of punch sectors 31 which are similar to the printing sectors 6, each printing sector having a corresponding punch sector 31. Each related pair of punching and printing sectors is driven in common from a respective result gear 11, previously noted. The sectors of each pair (printing and punching) are identical in profile; however, each printing sector includes raised type numerals along its arcuate working face 32, running from zero to nine, while each punch sector includes a pattern of selector slots 33 along its working face. These slots create the coded hole patterns which correspond to the numerals (0–9) displayed by the result wheel and printed by the mating type sector, as explained later. The actuating mechanism of the sectors is similar to that shown in the patent and for this reason, the following description is limited to those parts which are necessary to comprehend the punch selecting mechanism.

The printing and punching segments are shifted to their punching and printing positions during the reset rotation of the result gears 11, that is, during rotation of the gears from a numeral-indicating position back to the zero position. For this purpose, the driving system of the segments, which is mounted within housing 30, is uncoupled from the result gears 11 as they rotate forwardly from zero to a numeral-indicating position. After the result gears have rotated to positions indicating a result, they are coupled to the driving system of the segments of the printing and punching apparatus. As noted above, there is provided a corresponding printing and punching segment for each result gear, such that a digit is printed and punched corresponding to the digit previously exposed by each result wheel.

When the sub-total key is actuated after a deposit is entered (first operation), the result gears 11 rotate back to zero, thus shifting the punching and printing sectors to positions for recording that amount; thereafter, they rotate forwardly. Accordingly, when the last balance is picked up from the hole pattern (second operation) the gears rotate forwardly from the deposit position to indicate the sum of the last balance and new deposit. Upon actuation of the cancelling lever 14, all of the gears rotate back to zero thus setting the sectors to positions recording the total or new balance. The same action takes place in reverse order during a withdrawal (subtracting) operation.

Figure 4:
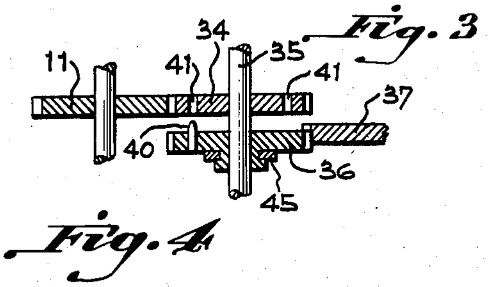
Figure 4 is a sectional view taken along line 4—4 of Figure 3, detailing one of the coupling gears which drives the punching sectors.

As best shown in Figures 3 and 4, each result gear 11 is coupled to the sector actuating mechanism by a respective idler gear 34 loosely journalled upon a shaft 35 within housing 30. Adjacent each idler gear 34 there is slidably mounted on shaft 35, a coupling gear 36 in constant mesh with a sector gear 37 journalled on a shaft 38. Each coupling gear 36 normally resides in disengaged position (Figure 4), allowing the result gear 11 and its related wheel to be rotated to its indicating position during a calculating cycle. The related printing and punching sectors normally reside in the zero position indicated in broken lines in Figure 3 during the calculating cycle, with the coupling gears disengaged.

As shown in Figure 4, each coupling gear 36 includes a tapered pin 40 arranged to enter one of a series of ten holes 41 formed in the idler gear 34. The holes 41 correspond to the numerals zero to nine of the result wheels. At the end of a calculating cycle, the idler gear 34 will have been rotated to a position in which one of its holes 41, corresponding to the digit displayed, is aligned with the tapered pin 40. When the coupling gear is shifted to its coupling position for activating the printing and punching apparatus, pin 40 enters the aligned holes; therefore, as the result wheels and gears 11 rotate back to zero; as indicated by the arrows in Figure 3, the printing and related punching sector of each result gear are advanced to print and punch the digit previously displayed by the result wheel. The parts are shown in full lines in Figure 3 in the printing and punching position they assume after the result wheels are returned to zero. After the printing and punching operation, the coupling gears 36 are disengaged and the sectors are shifted back to their zero positions by tension springs 42 which are connected to the respective sectors. This position is shown in broken lines in Figure 3.

As indicated in Figure 3, the gear sectors 37 individually are linked to a corresponding printing and punching sector. Each linkage system comprises a primary link or rod 8 having its upper end pivotally connected to its gear segment 37 and having its lower end connected to a driving lever 9 fixed upon a rock shaft 19 which is journalled within housing 30. Each rock shaft 19 extends laterally for the full length of housing to its printing and punching sector.

For actuating its printing and punching sectors, each rock shaft includes a second lever 29 (Figure 3) of the same length as driving lever 9 but angularly related to it. The swinging end of each second lever 29 is connected by a pair of links 29*a*, 29*b*, one extending to the printing sector and the other extending to the related punching sector. Thus, both sectors are shifted in unison by the gear sector 37. It will be noted at this point, that the companion punching sectors and printing sectors are loosely mounted upon a common shaft 39 and that the printing face and punching face of the sectors reside in corresponding positions whether active or inactive.

The coupler gears 36 are shifted to engaged or disengaged positions by respective solenoids which are operatively connected to a shift bar 43, one of the solenoids being indicated at 44 in Figure 3. Shift bar 43 includes a plurality of yokes 45, one for each coupling gear. The bar and yoke shifts all of the coupling gears to the disengaged position (Figure 4) as the result gears advance; before the gears rotate back to zero, one of the solenoids is energized to shift the bar and coupling gears to the engaged position. Therefore, as the result gears rotate back to zero during the sub-total or total recording, the sectors are shifted to positions to record the digit previously displayed by the result wheels. It will be noted that no movement is imparted from those result gears which remain at zero during these operations; hence, the sectors which are in driving connection with those particular gears remain at zero when the machine is cleared.

To align the printing sectors with the respective columns, the apparatus is provided with a lateral guide 46 as shown in Figure 1. The clerk places the sheet against the guide when the sheet is inserted, as explained below.

The printing sectors of the balance column remain inactive when the withdrawal or deposit amount is entered; these sectors being in driving connection with the accumulator of the calculating machine. Although the balance sectors may shift in accordance with the amounts deposited or withdrawn, the printing hammers of the deposit section remain inactive when the withdrawal or deposit amount is printed. For this purpose, the type hammers of the balance or total sectors are interconnected with the punching switch 26, the arrangement being such that the type hammers of the balance printing and punching sectors are actuated only during the punching cycle.

*Hole punching mechanism*

The punching mechanism, which perforates the code strip 23 in the punching section 16, is best illustrated in Figures 5–9. Each punch sector 31, as shown in these views, controls the punching action of a group of four punches indicated at 47. As noted earlier, the four punches of each group perforate a code pattern of holes in the sheet which represent the numerals 0 to 9 in accordance with the position of each punch sector 31. There is provided one sector and one group of punches for each digit to be recorded as a line of patterns in the punching sections 16.

The four punches 47 of each punch sector 31 are activated in various combinations to provide ten different code patterns (0–9), the selector slots 33 deactivating certain punches and the backing spaces 48 between the slots causing actuation of the selected punches. The actual punching is executed by punch hammers 50 (similar to the type hammers 28) which shift a perforated die plate 51 upwardly toward the cutting ends of the punches. The perforated die plate carries the record sheet 15 to the cutting ends of the punches (Figure 9), the cutting ends 52 being angular to provide a shearing action.

The punch hammers 50, similar to the type hammers shown in the Wittenmyer patent, are operated by punch solenoids 53 (Figure 3). In the case of the type hammers 28, a typewriter ribbon or the like is interposed between the working face 32 of the printing sectors according to conventional practice. The type hammers 28 of the balance sectors and the punch hammers 50 are energized only when the punch switch 26 is closed for the balancing operation. As shown diagrammatically in Figure 2, the punching switch 26 is interposed in one of the lines 54 leading to the punch soleniods 53 from the control system of the printing attachment. The lines which energize the type hammers for the withdrawal and deposit sectors (not shown) are energized by the control system, during an operating cycle each time an amount is entered into the calculator, as disclosed in the patent.

Figures 5, 6, 7, 8, 9:
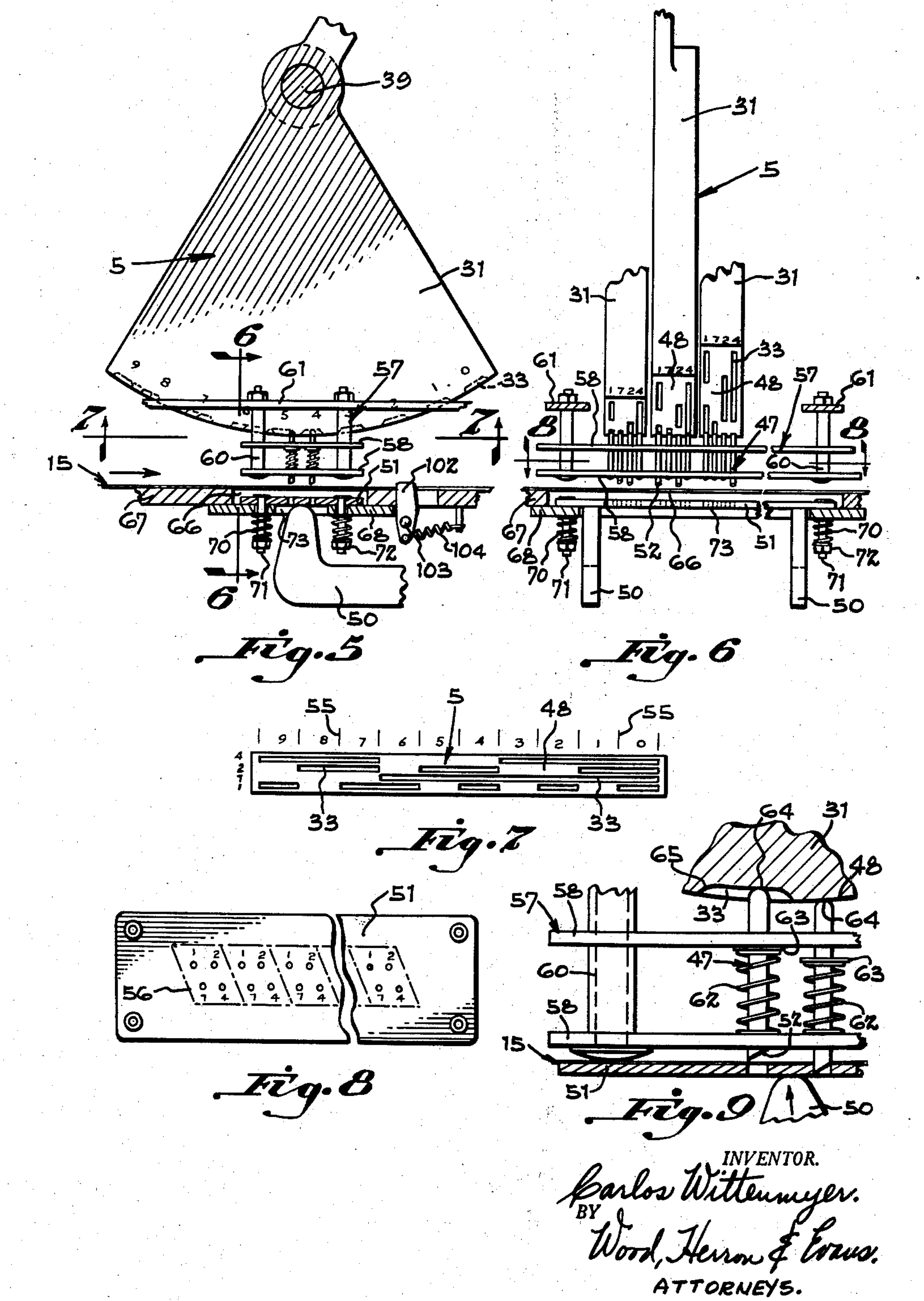
Figure 5 is an enlarged fragmentary view detailing one of the punch sectors and associated mechanism.
Figure 6 is an end view projected from Figure 5, further detailing the punching mechanism.
Figure 7 is a developed view of the face of one of the punch sectors as viewed along line 7—7 of Figure 5. This view illustrates the system of coded slots which provide selective activation of the four punches according to the code pattern.
Figure 8 is a sectional view taken along the line 8—8 of Figure 6, illustrating diagrammatically the grouping of the punches for each punch sector.
Figure 9 is an enlarged fragmentary view showing the operation of the punching mechanism.

Referring to Figure 7, which represents a development of the working face of one of the punch sectors, the positions of the sector for printing the numerals from 0 to 9 are indicated by the division lines 55. As shown in Figure 6, the four punches 47 of each group are located in alignment with the selector slots 33. Each group of four punches locates one or two holes in various positions within the parallelograms 56 indicated by the broken lines in Figure 8, each parallelogram representing a digit in a line of numbers.

As noted earlier, each column of keys for electrically punching and printing the balance consists of ten keys representing 0 to 9. However, according to the invention, only the "1," "2," "4" and "7" keys need be electrically operated to punch and print numerals from 0 to 9. The digits 1, 2, 4 and 7 are entered into the accumulator by direct energization of these keys upon signals from the reader. However, the remaining numerals (3, 5, 6, 8, and 9) are entered by additive or sequential depression of the same four keys in combination in response to repeated signal impulses from the reader. The code pattern of holes energizes the electrically responsive "1," "2," "4" and "7" keys in the following sequence to record the numerals 3, 5, 6, 8, and 9.

To obtain the numeral 3, the "1" and "2" keys of the bank are depressed electrically in sequence to store the numeral 3 in the accumulator. For the numeral 5, the "1" and "4" keys are depressed electrically in sequence. The numeral 6 is entered by depressing the "2" "4" keys. The numeral 8 is entered by the "1" and "7" keys, and 9 is entered by the "7" and "2" keys. The zero is entered when no signal is sent from the reader; in this instance, the result wheels and sectors remain in their zero position for that bank of keys.

The punches 47 are spring loaded upwardly and the punches are maintained in active position when their upper ends are engaged upon the backing surface 48 between the slots; they are free to shift to a retracted position when one of the slots is in registry with the upper end of the punch. Thus, as shown in Figure 9, only those punches which are in engagement with the backing surface 48 pierce the sheet 15 when the die plate 51 is elevated by the punch hammer 50.

Referring to Figure 7, it will be noted that all of the slots 33 are aligned with the punches in the zero position of the sector; hence, the punches are free to retract and no hole is punched in the parallelogram 56 when the die plate is elevated. The positioning of the punches in relation to the slots is indicated by the numerals 4, 2, 7, 1 at the left end of Figure 7. In the 1 position of the sector (Figure 7), the slots are aligned with the "2," "4" and "7" punches and the backing space 48 causes the operation of the "1" punch only. The backing spaces and slots also activate the "2," "4" and "7" punches individually as indicated in the diagram. It will be seen that the numeral 3 is coded by the "1" and "2" punches' 5 by the "1" and "4" punches; 6 by the "4" and "2" punches; 8 by the "1" and "7" punches; and 9 by the "2" and "7" punches. The code pattern thus is related to the four electrically operated keys of the calculator as noted above. The reader is provided with a corresponding pattern of four contact plungers, as explained later, the plungers passing in sequence through the holes to provide the additive key action.

Described in detail with reference to Figures 5 and 6, the groups of punches 47 are carried in respective punch cages 57 each consisting of spaced plates 58—58. The plates 58 are mounted in spaced relation upon spacers 60, the upper ends of the spacers being supported by respective cross rails 61 which have their opposite ends secured to the housing 30. Each individual punch 47 passes slidably through the plates 58 and each is biased upwardly by a spring 62 in compression against a snap ring 63 anchored to the upper portion of the punch (Figure 9). The lower end of each spring is seated against the lower plate 58 of the punch cage.

The upper ends of the punches are rounded as at 64, which provides a camming action with respect to the curved ends 65—65 of the slots 33. For simplicity, the springs have been omitted in Figure 6; however, it will be noted in this view that the cutting ends 52 of the active punches reside immediately above the plane of the sheet 15 in the lower portion of the die plate 51. At the upper limit of motion of the die plate (Figure 9), upon actuation of the punch hammers 50, the sheet is forced upon the ends of the active punches while the sheet remains blank at the inactive punches.

As shown in Figures 5 and 6, the die plate is mounted within an opening 66 formed in the bottom panel 67 of housing 30. It is supported by a mounting plate 68 attached to panel 67, the die plate being confined in its downward position by a pair of compression springs 70 confined on studs 71. The upper ends of the studs are anchored to the die plate and they pass through clearance openings formed in mounting plate 68, such that the springs 70 are in compression between mounting plate 68 and the nuts 72 threaded upon the lower ends of the studs. Mounting plate 68 includes a central opening 73 providing clearance for the operating ends of the punch hammers 50.

The solenoids 53 which actuate the punch hammers 50 provide sufficient energy to shift the die plate 51 to its perforating position counter to the compression springs 70. As soon as the punching operation is completed, the solenoids are deenergized and the die plate is shifted back to its inactive position by the compression springs 70, allowing the perforated sheet to be withdrawn.

*Reading apparatus*

A reading apparatus which coacts with the punching apparatus is disclosed in Figures 11–14. This structure is mounted in the rearward portion of housing 30 as previously indicated at 4 in Figure 1. Two types of electrical key actuating devices for entering the balance carried on the punched card, are illustrated in Figures 16 and 17. The key actuating devices are energized in response to the signals sent by the reading apparatus, as explained later.

The reading apparatus and key actuating devices are the subject matter of the aforesaid copending application of Carlos Wittenmyer, Serial No. 677,071. However, since this structure coacts with the punching apparatus, the following disclosure is necessary to a complete understanding of the punching apparatus and its operating principles.

The reading apparatus 4 comprises individual electrical readers, one for each digit to be stored in the punching section 16. Each reader comprises a set of four contact plungers 74 slidably carried in a cage 75. The plungers actuate the "1," "2," "4" and "7" keys and are located in positions which match the hole patterns delineated by the parallelogram areas 56, previously described with reference to Figure 8. The cage 75 of each reader comprises a pair of plates 76—76 mounted in spaced relationship to one another by a pair of spacers 77. The spaced plates 76, as well as the plungers 74, are fabricated from steel or similar magnetic metal. The plates 76 are permanently magnetized and form the two poles of a permanent magnet. The steel plungers 74 are loosely fitted within matching bores in the two plates and thus act as the armatures of the permanent magnet, being held in position by the magnetic flux of the plates. The magnetic action provides the sequential closing action of the plungers 74, as explained below. The plungers of the readers engage respective stationary contacts in accordance with the hole pattern, as explained below.

As shown in Figures 11 and 12, each reader cage is supported by leaf springs 78 which have their outer ends attached as at 80 to a cross bar 81 having its ends mounted within housing 30, as explained with reference to the cross bar 61 of the punch mechanism. The free ends of the leaf springs are connected as at 82 to the opposite ends of the upper plate 76. In the elevated position of the cage (Figure 1), the upper ends of the plungers contact the lower surface of cross bar 81. The heads 83 of the spacers 77 also contact the cross bar and space the upper plate properly from the bar.

It will be noted in Figure 12, that the plungers have progressively increasing lengths, such as their lower ends reside in an inclined plane as indicated at 84. The plungers are slidably held in the position of Figure 12 by the magnetic flux of the cage. The inclined plane of the plunger ends creates the sequential signals which are sent to the electrical keys "1," "2," "4" and "7."

In the preferred arrangement, the plunger for the "1" key, as indicated at A in Figure 12 has the greatest length, the plungers B, C and D being progressively shorter. The plungers are arranged to energize in sequence the "1," "2," "4" and "7" keys, as explained later.

To simplify the disclosure, the four plungers and their stationary contacts 85 are shown in Figures 12 and 13 residing in a single plane, although it will be noted in Figure 10 that the plungers actually are arranged in pairs side-by-side, matching the hole patterns of the parallelogram areas 56 in Figure 8. In other word, the position of the contact plungers 74 register with the punches 47. The stationary contacts 85, as shown diagrammatically in Figure 15, reside in registry with the pattern of contact plungers, such that the plungers sequentially engage the contacts as the reader cage is lowered to the contacts.

The stationary contacts are mounted in an insulating panel 86 which is set in the bottom panel 67 of housing 30 as best shown in Figure 3. An electrical circuit is completed from the plungers 74 to the stationary contacts by way of the line 87, which is energized through the control unit of the printing attachment. The reader switch 25 is interposed in the line 87, the switch being closed during the reading cycle. The reader circuit is shown in Figure 15 and operates in conjunction with the calculator as explained below.

When the balance is to be entered from the punched section 16, of statement 15, the sheet is inserted into the apparatus by the clerk until the upper edge 88 of the punch section 16 engages a fixed stop 90 (Figure 10). The stop 90 and lateral guide 46, locates the coded strip 23, which carries the last balance, precisely in registry with the plungers 74 and their stationary contacts 85. The reader cage 75 resides in its normal elevated position at this point. The clerk now closes the reader switch 25, then actuates the reader lever 24 (Figure 1).

The reader cage is lowered by a pair of eccentrics 91—91 carried on a shaft 92 which is journalled as at 93 for rotary motion. Shaft 92 is rotated through approximately one-half turn by the reader lever 24 which is attached to its outer end, a stop 94 (Figure 1) being mounted upon the end wall of housing to limit the motion of the lever. As the reader lever is swung forwardly, the shaft and eccentrics are rotated in the direction indicated by the arrow (Figure 13). The eccentrics bear against the surface of the top plate 76 of cage 75 and thus cause the cage to be lowered at a relatively slow rate counter to the leaf springs 78—78.

As the cage moves downwardly, the plungers 74 are held by magnetic flux in the position shown in Figure 12. As shown, the perforated strip 23 contains two perforations indicated at A′ and B′ hence, as the cage descends, plunger A passes through the aperture A′ and moves into contact with its stationary contact 85. This completes an electrical circuit from line 87 to one of the branch lines 95 which lead to the electrical device of the "1" calculator key. Upon being energized, the device depresses the "1" key momentarily, then releases it, thus entering the digit 1 into the accumulator. The action is similar to the manual operation of the keys in which the key is rapidly depressed and released with the finger.

Continued downward motion of the cage causes the B plunger to pass through the aperture B′ and into electrical contact 85, thus energizing another branch line 95. This completes a circuit through the electrical device of the "2" key in the same column, thus depressing the "2" key momentarily to enter 2 into the accumulator, which is added to the 1 previously entered and stored therein. It will be noted at this point, that the A plunger remains stationary with its stationary contact 85 while the cage continues to move along the plunger in the downward direction.

In the present example, the punched strip 23 is punched only for the A and B plungers; hence, as the C and D plungers descend, they contact the unperforated portion of the record sheet and are insulated from their contacts. Accordingly, no further signals are sent to the electrical devices in this particular column of keys. When the reader lever 24 engages its stop 94, the eccentrics 91—91 will have been rotated to the position of Figure 13. This completes the reading cycle, and the lever 24 and eccentrics 91 are then rotated back to the original position shown in Figure 12. For this purpose, there is provided the spring means (not shown) for rotating the shaft and eccentrics back to the starting position upon release of the lever.

Referring to Figure 13, the upper ends of the plungers 74 reside in an angular plane corresponding to the plane 84 of Figure 12 at the end of the reading cycle. As the cage is shifted back to its elevated position, the plungers are held in this position by magnetic flux until their upper ends are brought into contact with the lower surface of bar 81 so as to level the upper ends and reset them to the position in Figure 12 for the next reading cycle.

It will be understood that the structure disclosed in Figures 11–14 is duplicated for each column of the keys of the calculator. Thus, there is provided on shaft 92 duplicate pairs of eccentrics 91, one pair for each reader column. Actuation of the reader lever 24 thus actuates all of the readers at the same time.

For the purpose of obtaining precise registry of the punched strip 23 with the reading plungers 74, each strip 23 is severed at the end of the reading cycle, thus providing a new locating edge 88 engaging stop 90 for each reading cycle. For this purpose, the reading cage 75 includes a shearing knife 96 (Figures 12 and 13) having a cutting edge 97 which normally resides above the surface of the record sheet. The bottom panel 67 of housing 30 is provided with a slot 98 to accommodate the cutting edge 97 when the cage descends as in Figure 13. As indicated in Figure 10, the knife shears the punched strip 23 along the cutting line 100 at the end of the reading cycle. The severed strips are discharged from a slot 101 (Figure 3) formed along the rear wall of housing 30. Slot 101 also provides clearance for the extended printing section 17 of the bank statement as the strips 23 successively are sheared from the upper edge of the punching section 16.

According to the present disclosure, the shearing of strip 23 is also utilized in locating the printing section 17 in alignment with the printing sectors when printing the amount withdrawn or deposited during the first operation. For this purpose, the apparatus is provided with a shiftable stop 102 as indicated diagrammatically in Figures 1, 5 and 10. The stop 102 preferably is yieldable in order that the sheet may be passed over it into engagement with the fixed stop 90 during the second or reading operation. Thus, as detailed in Figure 5, the yieldable stop 102 may be in the form of a finger pivotally mounted as at 103 and biased in arresting position by a spring 104. In the stopping position, the stop 102 engages the top edge 88 during the first operation when the amount withdrawn or deposited is to be printed in section 17 of the bank statement. The stop 102 engaging the edge 88 aligns the printing section 17 precisely with the printing sectors 6 and aligns the punching section 16 with the punch plungers 47. The punches 47 are related to the yieldable stop 102 in the same manner as the reading plungers 74 are related to the fixed stop 90.

In order to align the sheet with the amount to be printed and punched in the balance line, the left edge of the sheet may be provided with a series of notches 105 (Figure 10) which are engaged with an indexing pin 106 for the balance printing operation. This arrangement is utilized because the punched strip 23 previously is severed during the reading operation; accordingly, if the newly severed edge 100 is brought into contact with the stop 102, then the balance line would be spaced out of alignment with the previously printed withdrawal or deposit amounts. The spacing of the notches 105 is such that when the notch adjacent the printed withdrawal or deposit amount is engaged with the indexing pin, the sheet is properly aligned with the printing sectors of the balance section, thus printing the new balance in alignment with the withdrawal or deposit figures as shown in Figure 10. Pin 106 preferably is yieldably mounted as described with reference to stop finger 102 to allow the sheet to be shifted laterally in locating the columns, as explained below.

In order to locate the columns in the amounts printed, the selector switches 10 are actuated, as noted earlier, for the withdrawal or deposit amount during the first operation and for the balance amount during the third operation by shifting the carriage laterally. This structure (not shown) does not form an essential part of the present invention, the details being fully disclosed in the patent. It will be understood that the structure is modified only in detail to locate the columns in alignment with the type sectors. The sheet feeding mechanism, which rotates the carriage rollers 27 to feed the sheet to and from the printing sectors, is not utilized when the punching and reading apparatus is controlled manually; the carriage rollers are utilized only in shifting the sheet transversely for column selection.

Described generally, the sheet feeding roller mechanism 27, for shifting the sheet laterally for column selection, comprises an upper roller 107 and a lower roller 108 (Figure 3). When the sheet is fed into the apparatus, the lower roller 108 remains in its lowered position, and during the printing cycle, the lower roller is elevated by a solenoid 110 (Figure 3) which is interconnected as at 111 with the lower roller. When solenoid 110 shifts roller 108 upwardly, the sheet 15 is engaged between the two rollers. Thereafter, the control mechanism of the printing attachment shifts the rollers laterally in accordance with the position signalled by the column selector switches 10. As the sheet is shifted, the index pin 106 yields to permit it to pass; the pin snaps back to its indexing position when the sheet is shifted back to its starting position. When the sheet reaches its lateral column position, the type hammers 28 are energized to print the amount exposed by the printing sectors. After printing, the rollers are shifted laterally back to the starting position carrying with them the printed sheet. This operation takes place during the first operation when the deposit or withdrawal sum is printed and also during the third operation when the total balance sum is printed. The sheet is in its starting position against the lateral guide 46 when the hole pattern is read during the second operation and when the new hole pattern is punched during the third operation. In other words, the control system is arranged to shift the sheet back to the starting position after printing the balance but before the new balance is punched.

It will be noted that if the printing, punching, and reading operations are to be executed automatically, then the sheet feeding apparatus of the patent may be utilized with suitable modifications to provide the required motions. In automatic feeding, the indexing stop 106 and notches 105 preferably are utilized to position the sheet initially at the start of the cycle. In this case, the rollers 107 and 108 move into engagement with the sheet at the start of each printing cycle, as in the patent, rotate to shift the sheet inwardly and outwardly to align the sheet with the printing and punching sectors and with the reader during the cycle.

For automatic operation, the control system of the patent may be modified slightly so as to shift the sheet longitudinally and transversely, by operation of the carriage, through the cycle sequence in an automatic manner. Thus, the sheet may be placed manually against guide 46 at the start of the cycle and thereafter shifted longitudinally and transversely by the carriage during the printing, reading and punching operations.

*Electrical key actuating devices*

As noted earlier, the keys "1," "2," "4" and "7" are equipped with electrical actuating devices for operation in response to the reader signals. As shown in Figure 16, the key 112, which represents any one of the power operated keys, includes a stem 119 which is provided with an elongated slot 113 through which passes the plunger 114 of a solenoid coil 115. The outer end of the plunger 114 includes a key-actuating cam 116, which acts upon the lower edge of slot 113. The plunger normally is shifted to the extended position shown in full lines by a compression spring 117 engaging the rearward end of the plunger. When coil 115 is energized, the plunger is withdrawn to the position shown in broken lines, counter to spring 117.

During the retracting motion of the plunger, its upper surface is engaged against the lower edge of the flap element 118 which is pivoted as at 120 to a pin mounted within the casing of the calculator. The flap element lies in contact with the stem 119 of the key during the retracting motion of the plunger. Since the flap 118 restrains the plunger 114 against upward movement, its cam 116 acts against the lower edge of slot 113 and depresses the key as indicated in broken lines, thus entering into the accumulator the amount represented by the key.

When the solenoid 115 is deenergized, the plunger 114 is shifted by spring 117 outwardly to its full line position. As the plunger 114 is shifted outwardly by spring 117, the flap element 118 swings outwardly, as shown in broken lines, allowing plunger 114 to shift upwardly as its cam 116 rides over the lower edge of slot 113. Therefore, the key is not depressed during the return motion of the plunger when the solenoid is deenergized. The flap element 118 includes an upper projection 121 connected to a tension spring 122 which urges the flap element to its normal downswung position. After cam 116 passes beyond slot 113, the plunger 114 drops to the position shown in full lines and the spring 122 shifts the flap element downwardly to its normal position, ready for the next cycle. Since the flap element is pivoted independently of the stem 119, the key is free to be depressed manually without interference. It will be noted that this arrangement causes the key to be depressed once upon energization of solenoid coil 115. The slot 113 of stem 119 provides clearance for depressing the key manually; hence, the electrical device does not interfere with manual operation of the key.

The modified electrical device of Figure 17 provides the same operation of above described. In this case, the solenoid coil 115 includes a plunger 123 which normally is urged to the right hand position shown in full lines by a tension spring 124. The plunger is stopped in this position by a pin 125. A bell crank lever 126 is pivoted as at 128 to the plunger 123, and a latch 127 is pivoted as at 129 to the bell crank lever.

The latch normally is held in the position shown in full lines by a tension spring 130 connecting the latch to bell crank lever 126. The upper end of the latch 127 includes a hook 131 normally engaging the cross piece 132 of the stem of the modified key 134. Intermediate the length of latch 127, there is provided a projecting cam or spur 135. When the solenoid coil is energized, plunger 123 shifts to the left as indicated by the arrow, causing the bell crank 126 to swing about its pivot point 133. This shifts the latch 127 downwardly, thus depressing the key as indicated by the broken lines. When the key is fully depressed, the inclined surface of cam 135 acts against the fixed pin 136, causing the latch to swing about its pivot point 129 until its hook 131 disengages the cross piece 132 of the key. At this point, the key snaps back to its normal position, the amount having been entered into the accumulator. The latch remains in the position shown in broken lines until the solenoid is deenergized, at which point, the springs 124 and 130 shift the parts back to the position shown in full lines. It will be noted that the latch 127 does not interfere in any way with the manual operation of key 134.

The circuit for energizing the key actuating solenoids 115 is shown diagrammatically in Figure 15. The circuit is powered by the power lines 87 and 137 which are energized by the control system of the printing attachment during the reading cycle. As noted earlier, reader switch 25 in line 87 is closed manually during the reading cycle. The circuit from the reader plungers 74 to the contacts 85 is completed by way of the branch lines 95 previously noted. These lines as shown in Figures 15–17, are in connection with one side of the solenoid windings 115. The circuit through the windings is completed by way of branch lines 138 which lead to the power line 137. The illustrated circuit provides actuation of the "1," "2," "4" and "7" keys of one column, a similar circuit being provided for each column of keys.

The eccentrics 91—91 shift all of the reader cages 75 downwardly at a relatively slow rate so that there is created a time interval as the contacts sequentially are closed and energized. In the conventional calculating machine, under manual operation, the amounts are fed into the accumulator as the key is depressed and released in a fraction of a second. In the present actuating devices, the solenoids depress and release the keys with the same or greater speed, such that the amount is fed into the accumulator and the key is released before the next reader plunger 74 makes contact. Accordingly, the reader and electrical devices are accommodated to conventional calculating machines and require no major alteration in the calculator other than equipping the keys with the electrical devices.

It will be understood that the foregoing disclosure is intended to illustrate the principles of the invention as applied to one practical use. It will be evident that the punching apparatus and reading apparatus may be utilized in solving a great many problems which involve recording a sum or quantity on a punched card for use in conjunction with calculating machines wherein the punched hole pattern is scanned or read to provide automatic operation of the machine.

Having described my invention, I claim:

1. A punching apparatus for a calculating machine having a result indicator which indicates the result of the calculation, said apparatus punching in a record sheet a coded hole pattern representing said result, said punching apparatus comprising a punch cage, a group of punches slidably mounted in said cage, said punches having cutting ends, a shiftable punch selector mounted relative to said cage, said selector having a series of backing surfaces, said backing surfaces delineated by elongated recesses formed in said selector, said elongated recesses extending lengthwise in the direction of motion of the shiftable punch selector, said backing surfaces being disposed in endwise relation to the elongated recesses, said punches having respective contact portions residing in registry with said backing surfaces, means connecting said punch selector to said result indicator, whereby said result indicator shifts the punch selector relative to said punches, said backing surfaces contacting the contact portions of selected punches and said recesses deactivating the remaining punches, a die plate residing in spaced relationship to the cutting ends of said punches, said die plate having a hole pattern which registers with said cutting ends, and power means connected to the die plate for shifting the same upon the cutting ends of said punches, whereby a pattern of holes corresponding to said activated punches is perforated in a record sheet interposed between said die plate and said cutting ends.

2. A punching apparatus for a calculating machine having a result indicator which indicates the result of the calculation, said apparatus punching in a record sheet a coded hole pattern representing said result, said punching apparatus comprising a punch cage, a group of punches mounted for axial motion in said cage, said punches having cutting ends, a punch selector pivotally mounted relative to said cage, said selector having an arcuate working face including a series of backing surfaces, said backing surfaces delineated by elongated recesses formed in said selector, said elongated recesses extending lengthwise in the direction of motion of the punch selector, said backing surfaces being disposed in endwise relation to the elongated recesses, the said recesses having differential lengths, said punches having contact ends opposite said cutting ends residing in registry with said backing surfaces, means connecting said punch selector to at least one of the result indicators of the calculating machine, said indicator pivoting the said arcuate working face to a punch selecting position relative to the contact ends of the punches, said backing surfaces contacting said contact ends of selected punches and activating the same said recesses deactivating the remaining punches, the differential lengths of said recesses providing a code, whereby the backing surfaces activate selected punches in predetermined combinations, a die plate residing in spaced relationship to the cutting ends of said punches, said die plate having a hole pattern which registers with said cutting ends, and power means connected to the die plate for shifting the same upon the cutting ends of said punches, whereby a pattern of holes corresponding to said activated punches is perforated in a record sheet interposed between said die plate and said cutting ends.

3. A punching apparatus for a calculating machine having a result indicator which indicates the result of the calculation, said apparatus punching in a record sheet a coded hole pattern representing said result, said punching apparatus comprising a punch cage, a group of punches slidably mounted for axial motion relative to said cage, a shiftable punch selector mounted adjacent the ends of said punches and movable longitudinally in a path generally at right angles to the axes of said punches, said selector having a series of backing surfaces extending longitudinally thereof in the direction of motion of the selector, said backing surfaces disposed in alignment with the ends of the respective punches, said backing surfaces being interrupted by longitudinal recesses along the length thereof, means connecting said punch selector to said result indicator, whereby said result indicator shifts the punch selector along said path relative to the ends of said punches, said backing surfaces contacting the ends of selected punches and activating the same, said longitudinal recesses deactivating the remaining punches, said punches having cutting ends, a die plate residing in spaced relationship to the said cutting ends, said die plate having a hole pattern which registers with said cuttings ends, and means for relatively shifting the die plate and cutting ends, with a record sheet disposed therebetween, whereby a pattern of holes corresponding to said activated punches is perforated in a record sheet.

4. A punching apparatus for a calculating machine having a result indicator which indicates the result of the calculation, said apparatus punching in a record sheet a coded hole pattern representing said result, said punching apparatus comprising a punch cage, a group of punches mounted for axial motion relative to said cage, said punches having cutting ends, a punch selector pivotally mounted relative to said cage, said selector having an arcuate working face including a series of backing surfaces, said backing surfaces delineated by longitudinal recesses formed in said working face, said backing surfaces extending longitudinally along said working face and in alignment wih the axes of punches and being interrupted longitudinally by said recesses, said punches having contact ends opposite said cutting ends engageable with said backing surfaces, means connecting said punch selector to said result indicator, said indicator pivoting the said arcuate working face to a position relative to the contact ends of the punches, said backing surfaces thereupon engaging the contact ends of selected punches and activating the same said recesses disposed in registry with the remaining punches and deactivating the same, said longitudinal recesses and backing surfaces having differential lengths adapted to activate selected punches in predetermined combinations, a die element residing in spaced relationship to the cutting ends of said punches, said die element having a hole pattern which registers with said cutting ends, and means for relatively shifting the die element and cutting ends toward one another with a record sheet disposed therebetween, whereby a pattern of holes corresponding to said activated punches is perforated in the record sheet.

5. A punching apparatus for a calculating machine having a result indicator which indicate the result of the calculation, said apparatus punching in a record sheet a coded hole pattern representing said result, said punching apparatus comprising a punch cage, a group of punches mounted for axial motion relative to said cage, said punches having cutting ends, a punch selector pivotally mounted relative to said cage, said selector having an arcuate working face including a series of backing surfaces, said backing surfaces delineated by longitudinal recesses formed in said selector, said punches having contact ends opposite said cutting ends residing in alignment with said backing surfaces, means connecting said punch selector to said result indicator, said indicator pivoting the said arcuate working face to a position relative to the contact ends of the punches, said backing surfaces thereupon being in registry with the contact ends of selected punches and said recesses disposed in registry with the contact ends of the remaining punches, spring means connected to said punches and urging the same axially toward said working face, whereby the contact ends of selected punches are engaged by the backing surfaces with the cutting ends thereof extended, while the remaining punches are retracted axially to a non-cutting position, a die plate residing in spaced relationship to the cutting ends of said punches, said die plate having a hole pattern which registers with said cutting ends, and means connected to the die plate for shifting the same toward the cutting ends of said punches with a record sheet disposed between the die plate and said cutting ends, whereby a pattern of holes corresponding to the said extended punches is perforated in a record sheet interposed between said die plate and said cutting ends.

References Cited in the file of this patent

UNITED STATES PATENTS

| | | |
|---|---|---|
| 1,110,643 | Peirce | Sept. 15, 1914 |
| 2,177,788 | Ross | Oct. 31, 1939 |
| 2,413,884 | Page | Jan. 7, 1947 |
| 2,637,493 | Wittenmyer | May 5, 1953 |
| 2,838,361 | Findlay et al. | June 10, 1958 |